(No Model.)
E. BREEDING.
FOLDING MINNOW NET.
No. 572,785. Patented Dec. 8, 1896.
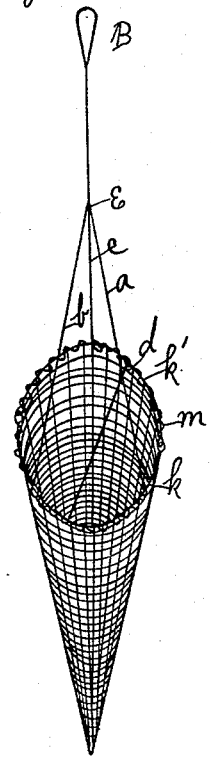
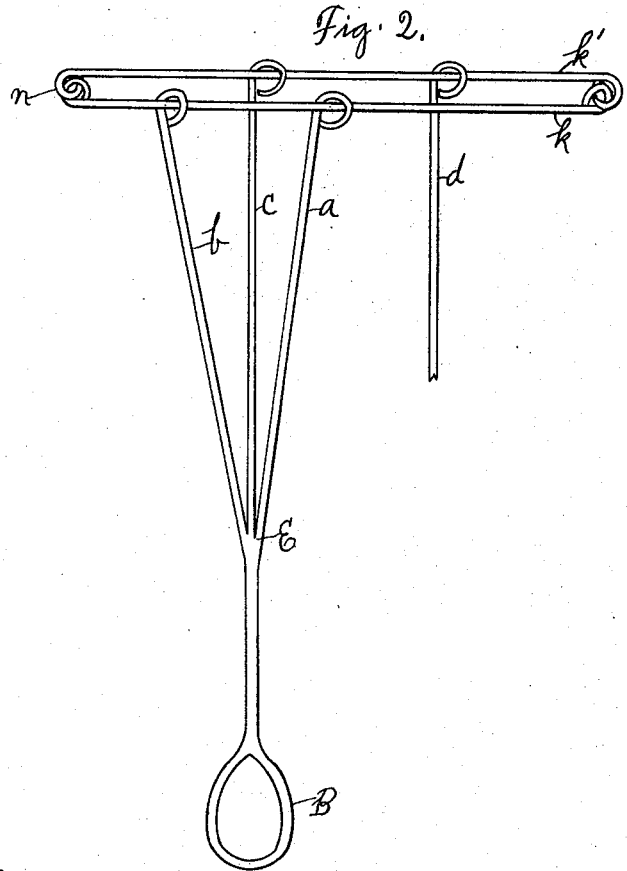
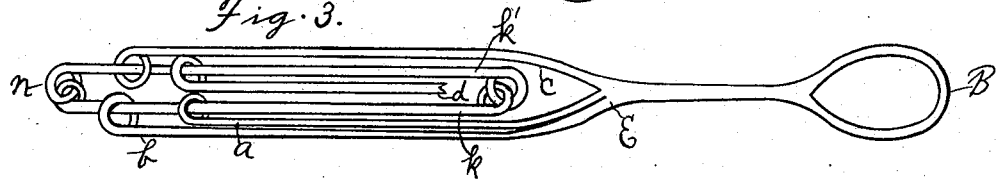
Witnesses:
James Gilford Browning
J. E. Halsell
Inventor,
Enoch Breeding.
By his Attorney
A. L. Jackson.
THE NORRIS PETERS CO., PHOTO-LITHO., WASHINGTON, D. C.

UNITED STATES PATENT OFFICE.

ENOCH BREEDING, OF FORT WORTH, TEXAS.

FOLDING MINNOW-NET.

SPECIFICATION forming part of Letters Patent No. 572,785, dated December 8, 1896.

Application filed January 6, 1896. Serial No. 574,481. (No model.)

*To all whom it may concern:*

Be it known that I, ENOCH BREEDING, a citizen of the United States, residing at Fort Worth, in the county of Tarrant and State of Texas, have invented certain new and useful Improvements in Minnow-Nets, of which the following is a specification.

My invention relates to improvements in fishing-nets, and particularly to frames for nets which can be set up in the water in various places where other nets cannot be used and which can be folded up into a small package for convenient carrying.

Other objects and advantages will be fully understood from the following description and claims when taken in connection with the accompanying drawings, in which similar characters of reference are used to indicate the same parts throughout the several views.

Figure 1 is a perspective of my invention raised up in the act of making a catch. Fig. 2 is a perspective of the frame in the act of folding. Fig. 3 represents the frame folded. Fig. 4 represents a hook which is used to hold the net while being set.

An ordinary fishing-net is attached to two steel wires $k$ and $k'$. These wires have loops in each of their ends by which they are attached together. A rod $d$, having a loop in one end and a notch in the other, is used to hold the wires $k$ and $k'$ apart, so that the net is spread. Upright rods or wires $a$, $b$, and $c$ have loops in their ends through which the wires $k$ and $k'$ are run. These loops are curved out of a straight line with their rods or wires, as illustrated in Fig. 2. These rods constitute a means for raising the net. They are made any suitable length to extend above the water and are welded together at E. A handle B is made integral with this welded portion. A cord $m$ is interlaced in the netting and passed around the rim and around the wires $k$ and $k'$ and through the loops in the rods $a$, $b$, $c$, and $d$ to hold these rods in place when the net is set. This cord is attached to the loops in wires $k$ and $k'$ at one end and is held in place by a hook $o$ at the other end while the net is being spread. This hook $o$ is attached to the loop in wire $k$ or $k'$. The loops in the rods $a$, $b$, $c$, and $d$ are all bent in the same direction. This feature permits these rods to be folded together with the wires $k$ and $k'$.

To fold the net, take the cord $m$ out of hook $o$, letting the handle B fall to the position shown in Fig. 2. Then push the rods $a$, $b$, $c$, and $d$ toward end marked $n$. Then fold as shown in Fig. 3. The net can then be put in a small case.

It will be seen that I have devised a fishing-net which can be manufactured at small cost and one that is especially useful in catching small fish for bait.

To spread the net, unfold it, hitch the cord $m$ in hook $o$, separate the wires $k$ and $k'$, and put rod $d$ in place. The net is then ready for use. It can be set on the bottom of water and be raised for catching fish whenever desired, or it may be suspended in the water in any convenient way. This net is intended especially for catching minnows for bait, as it can be placed among flags, shoals, or other places where minnows congregate for protection against larger fish and where other nets cannot be used.

Having fully described my invention, what I claim as new, and desire to secure by Letters Patent, is—

1. A fishing-net composed of a net, two steel spring-wires looped together for spreading said net and making a circular rim for said net, a rod for holding said wires in a circular position, said rod having a loop in its end by which it is attached to one of said wires and a notch in the other end in which the other wire is held, and a hook for holding said rod and net in place.

2. A fishing-net composed of two steel spring-wires, a net attached to said wires, said wires having loops by which they are attached together, a rod having a loop in one end and a notch in the other for holding said wires in a circular position, three upright rods or wires constituting a handle for the device having their upper ends welded together, loops in their lower ends by which said rods are put on said steel spring-wires, said loops being bent whereby all of said rods and wires can be folded together, a cord for holding said rods in place, and a hook for holding said cord in place.

3. In a net for catching minnows for fish-bait the combination of a net, steel spring-wires for spreading said net, a rod for holding said wires in a circular position, upright rods having bent loops in one of their ends and being welded together at the other end, whereby said net can be placed on the bottom of the water when set, and whereby said net can be folded into a small package for convenient carrying.

ENOCH BREEDING.

Witnesses:
JAS. C. SCOTT,
R. H. GORGAS.